United States Patent [19]

White

[11] Patent Number: 5,086,028

[45] Date of Patent: Feb. 4, 1992

[54] SELECTIVE CATALYTIC PROCESS FOR PREPARING N-HALOTHIOSULFONAMIDE MODIFIED TERPOLYMERS AND CATALYSTS THEREFOR

[75] Inventor: Donald A. White, Edison, N.J.

[73] Assignee: Exxon Chemical Patents Inc., Linden, N.J.

[21] Appl. No.: 588,677

[22] Filed: Sep. 26, 1990

Related U.S. Application Data

[60] Division of Ser. No. 403,630, Sep. 6, 1989, Pat. No. 5,017,662, which is a continuation-in-part of Ser. No. 244,743, Sep. 15, 1988, Pat. No. 4,956,420.

[51] Int. Cl.$^5$ ............................................. B01J 31/04
[52] U.S. Cl. ..................................... 502/170; 525/351
[58] Field of Search ........................................ 502/170

[56] References Cited

U.S. PATENT DOCUMENTS

| | | | |
|---|---|---|---|
| 3,904,591 | 9/1975 | Fischer | 502/170 X |
| 4,465,826 | 8/1984 | Wellner et al. | 502/170 X |
| 4,548,995 | 10/1985 | Kowalski et al. | 525/354 |
| 4,554,326 | 11/1985 | Kowalski et al. | 525/354 |
| 4,604,452 | 8/1986 | Shimp | 502/170 X |
| 4,820,780 | 4/1989 | Hopper | 525/351 |

*Primary Examiner*—Patrick P. Garvin
*Attorney, Agent, or Firm*—Marthe L. Gibbons; John E. Schneider

[57] ABSTRACT

A catalyst composition is provided which comprises at least one specified metal salt of a weak acid and a zinc salt of a weak acid or an iron salt of a weak acid. A process for preparing a N-halothio-sulfonamide-modified terpolymer of ethylene, an alpha olefin and a diene utilizing the catalyst is also provided. The catalyst is a selective catalyst in this process.

6 Claims, No Drawings

SELECTIVE CATALYTIC PROCESS FOR PREPARING N-HALOTHIOSULFONAMIDE MODIFIED TERPOLYMERS AND CATALYSTS THEREFOR

This is a division of application Ser. No. 403,630, filed Sept. 6, 1989, and now U.S. Pat. No. 5,017,662 which is a continuation-in-part of application Ser. No. 244,743 filed Sept. 15, 1988 and now U.S. Pat. No. 4,956,420.

BACKGROUND OF THE INVENTION

1. Field of the Invention

The present invention relates to a selective catalytic process for preparing N-halothiosulfonamide modified terpolymers of ethylene-alpha olefin-diene, and catalyst compositions suitable for use in this process.

2. Description of Information Disclosures

Modified polymers of the type of interest herein, specifically rubbery polymers, are described in U.S. Pat. No. 3,915,907 and U.S. Pat. No. 3,970,133 (R. J. Hopper) incorporated herein by reference. The desirability and advantages of such polymers was additionally disclosed in articles authored and co-authored by R. J. Hopper (Rubber Chemistry and Technology, Vol. 49, p. 341–352 (1976) and International Conference on Advances in the Stabilization and Controlled Degradation of Polymers, Lucerne, Switzerland, May 23–25, 1984).

These references describe the reaction of various N-chlorothioamides, and particularly N-chlorothiosufonamides with various ethylene propylene diene monomer (EPDM) rubbers in solutions (see, e.g., Examples I-XII of U.S. Pat. No. 3,915,907) as well as by mixing in a Banbury ® type internal mixer (Examples XIII-XVI of U.S. Pat. No. 3,915,907). Furthermore, in Example XVII of the same reference, there is disclosed in a solution reaction the use of powdered anhydrous zinc chloride (this is referred to as a catalyst in Table I, footnote g and page 346 of the cited Rubber Chemistry and Technology article). The references contain no further disclosure concerning the effect of zinc chloride nor do they suggest the use of other catalytic agents.

U.S. Pat. No. 4,820,780 issued Apr. 11, 1989 discloses a method of preparing a N-chlorothiosulfonamide-modified terpolymer of ethylene, alpha olefin containing from 3 to 6 carbon atoms and a diene in the presence of a saturated aliphatic carboxylic acid containing from 6 to 30 carbon atoms, such as stearic acid. Calcium carbonate may also be added to the reaction as a scavenger for the HCl by-product. It does not suggest the use of metal salts of weak acids as catalysts.

It would be desirable to improve the rate of reaction, the conversion and product quality produced by known processes to achieve commercially useful conditions. It would be particularly useful to improve the melt phase process so as to enhance the addition reaction while minimizing the crosslinking reaction.

It has now been found that certain catalyst compositions comprising zinc salts or iron salts of weak acid in combination with a metal salt of certain metals (other than zinc or iron) of weak acids (i.e., co-catalyst) are selective catalysts in the preparation of N-halothiosulfonamide modified terpolymers of ethylene-alpha olefin-diene. By "selectively," it is intended herein that the desired addition reaction is increased while the undesired crosslinking reaction, which leads to increased Mooney viscosity and to gelation, is minimized.

Mixtures of blends of low-unsaturation rubbery polymers, particularly EPDM, with highly unsaturated rubbery polymers are of practical importance because of the superior ozone resistance imparted to the blend by the low-unsaturation EPDM rubber. Unfortunately, the presence of the low-unsaturation rubber also affects the mechanical and hysteresis characteristics of the vulcanizates in an adverse manner, as evidenced by lower tensile strength and modulus values, and by higher dynamic heat build-up and permanent set. These undesirable responses are contributed to by the mutual incompatibility of the two types of rubber, the substantially slower cure rate of the low-unsaturation rubber, and the greater affinity of the typically polar curvatures for the high-unsaturation rubber. As a result, the vulcanized blend is a heterogeneous dispersion of poorly cured and/or largely uncured low-unsaturation rubber in well cured high-unsaturation rubber. The resulting poorer mechanical and hysteresis properties severely limit, or preclude, the use of such blends in articles subjected to severe service requirements such as tires. A method for improving the physical and dynamic properties of such rubbery polymer vulcanized blends is of considerable commercial and practical importance.

SUMMARY OF THE INVENTION

In accordance with the invention there if provided, a process for preparing a N-halosulfonamide-modified terpolymer, which comprises the step of reacting a terpolymer of ethylene, and alpha olefin containing from 3 to 16 carbon atoms and a non-conjugated diene, wherein said diene following incorporation in said terpolymer does not include an olefinic carbon atom which is fully substituted, with a N-halothio-sulfonamide in the presence of a catalyst comprising: (a) a first salt of a weak acid, said first salt being represented by the formula MAn, wherein A is an anion or mixture of anions of a weak acid, and M is a metal selected from the group consisting of zinc, iron and mixtures thereof; and (b) an effective amount of a second salt of a weak acid, said second salt being represented by the formula TAn wherein T is a metal selected from the group consisting of nickel, chromium, a Group IIA metal of the Periodic Table of Elements and mixtures thereof and wherein A is an anion or mixture of anions of a weak acid, which is the same or different from the anion of said first metal salt and wherien n in said first metal salt and in said second metal salt is a number corresponding to the respective oxidation state of M or T divided by the valence of said anion.

Furthermore, in accordance with the invention, there is also provided a catalyst composition comprising: (a) a first salt of a weak acid being represented by the formula MAn, wherein A is an anion or mixture of anions of a weak acid, and M is a metal selected from the group consisting of zinc, iron and mixtures thereof; and (b) an effective amount of a second salt of a weak acid, said second salt being represented by the formula TAn, wherein T is a metal selected from the group consisting of nickel, chromium, a Group IIA metal of the Periodic Table of Elements, and mixtures thereof, and wherein A is an anion or mixture of anions which is the same or different from the anion of said first metal salt and wherein n in said first metal salt and in said second metal salt is a number corresponding to the respective oxidation state of M or T divided by the valence of said anion.

The Periodic Table referred to herein is in accordance with the table published by Sargent-Welch, copyright 1968, Sargent-Welch Scientific Company.

DETAILED DESCRIPTION OF THE INVENTION (A) Terpolymer. The term ethylene-alpha-olefin-diene monomer terpolymer ("EPDM") as used herein with respect to the unmodified EPDM of this invention is meant to be inclusive of terpolymers, tetrapolymers, etc. Thus the EPDM will comprise ethylene, one or more alpha-olefins, and one or more diene monomers, can be substantially amorphous, and can have a substantially random arrangement of at least the ethylene and the alpha-olefin monomers.

The EPDM, prior to modification with N-chlorothio-sulfonamide (as described below) will generally have a weight average molecular weight (Mw) in the range between about 10,000 and 1,000,000 or higher, typically between about 15,000 and 500,000, and more typically between about 20,000 and 350,000.

Typically EPDM is "substantially amorphous," and when that term is used to define the EPDM it is to be taken to mean having a degree of crystallinity less than about 25%, preferably less than about 15%, and more preferably less than about 10% as measured by means known in the art. Three major methods of determining crystallinity are based on specific volume, x-ray diffraction, and infrared spectroscopy. Another well-established method, based on measurement of heat content as a function of temperature through the fusion range, is now easily carried out using differential scanning calorimetric measurements. It is known that these independent techniques are in good experimental agreement. However, it should also be recognized that EPDM which contains higher levels of crystallinity, and therefore is other than substantially amorphous can also be modified by the invention disclosed herein.

EPDM useful in this invention will contain aobut 20 to about 90 weight percent ethylene, preferably about 30 to 85 weight percent ethylene, and even more preferably about 35 to about 80 weight percent ethylene.

Alpha-olefins suitable for use in the preparation of the EPDM are preferably $C_3$-$C_{16}$ alpha-olefins. Illustrative non-limiting examples of such alpha-olefins are propylene, 1-butene, 1-pentene, 1-hexene, 1-octene, and 1-dodecene. The alpha-olefin content of the EPDM prior to modification is generally about 10 to about 80 weight percent, preferably about 20 to about 70 weight percent. The preferred alpha-olefin for the purposes of this invention is propylene.

The diene monomers useful in this invention include those typically used in EPDM polymers prepared by Ziegler-Natta polymerization. Such diene monomers are selected from the polymerizable, non-conjugated dienes and can be straight chain, hydrocarbon di-olefins or cycloalkenyl-substituted alkenes, having about 6 to about 15 carbon atoms, for example: Straight chain acyclic dienes such as 1,4-hexadiene and 1,6-octadiene and multi-ring alicyclic fused and bridged ring dienes such as dicyclopentadiene as well as certain norbornene compounds which satisfy the requirement described hereinbelow, e.g., propenyl norbornene and crotyl norbornene; and mixtures thereof. Of these, the preferred dienes are 1,4-hexadiene and dicyclopentadiene, most particularly 1,4-hexdiene.

After incorporation in the polymer, the residual unsaturation contributed by the diene monomer should not result in an olefinic carbon atoms which is fully substituted (a quarternary carbon atom). Therefore, dienes such as 5-ethylidene-2-norborene and 5-methylene-2-norbornene are not preferred because one of the residual olefinic carbon atoms in the polymer is fully substituted.

The total diene monomer content in the EPDM may suitably range from about 0.1 to about 15 weight percent, preferably 0.5 to about 12 weight percent, and most preferably about 1.0 to about 6.0 weight percent. In those instances where a combination of dienes is used, the preferred diene should comprise at least about 20 percent of the diene present in the polymer, preferably at least about 40 percent, most preferably at least about 60 percent, for example at least about 75 percent.

(B) N-halothio-sulfonamide. The term N-halothiosulfonamide includes reactants of the formula

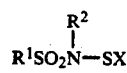

where x is chlorine or bromine, preferably chlorine (N-chlorothio-sulfonamide), hereinafter referred to as CTSA, where $R^1$ and $R^2$ are selected from the group consisting of alkyl radicals having 1-20 carbon atoms, aralkyl radicals having 7-20 carbon atoms, aralkyl radicals having from 7-20 carbon atoms, and aryl and substituted aryl, e.g., haloaryl, radicals having 6-10 carbon atoms and where $R^1$ is also selected from radicals having the formula

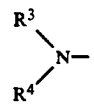

where $R^3$ and $R^4$ are individually selected from said alkyl, aralkyl, and aryl and substituted aryl, e.g., haloaryl, radicals and where $R^3$ and $R^4$ can be joined together to represent radicals selected from $-(CH_2)-n$, where n is an integer of 4 to 7, and $-(CH_2)_2-O-(CH_2)_2-$.

In the practice of this invention, for the N-chlorothio-sulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals sutiable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, terty butyl, 1-eicosyl, cyclohexyl benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are N-chlorothio-N-methyl-methanesulfonamide, N-chlorothio-N-methyl-benzenesulfonamide, N-chlorotio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfonamide,
N-chlorothio-N-methyl-N',N'-(pentamethylene)sulfonamide,
N-chlorothio-N-methyl-N',N'-diethylsufonamide and
N-chlorothio-N-phenyl-benzenesulfonamide.

Chlorothiosulfonamides suitable for use in the admixture of the present invention, as well as their preparation, have further been described in the patent literature. For example, West German DPS No. 1,156,403 shows the preparation of chlorothio-sulfonamides by reaction of a sulfonamide with $SCl_2$ in the presence of an organic acid acceptor.

West German DPS No. 1,1014,407 shows the preparation of chlorothiosulfonamides from N,N -dithiobis(-sulfonamides) and chlorine or sulfuryl chloride. The chlorothiosulfonamides of the present invention can be prepared by analogous procedures.

The term "CTSA" is used herein to denote any of the N-halothiosulfonamide. The preferred amount of CTSA added depends on the specific nature of the low unsaturated (EPDM) polymer, the specific nature of the highly unsaturated polymer or polymers to be used in a blend of the two types of polymers, the specific cure system and the characteristics desired for the final vulcanizate. The ratio, (moles CTSA)/(moles unsaturated sites in the polymer) may range from about 0.03/1 to about 1/1, but is preferably in the range of about 0.15/1 to about 0.8/1 and more preferably about 0.2/1 to about 0.7/1. It is disclosed in U.S. Pat. No. 3,915,907 that, "with some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer vicosity beyond the point of ease of processability" (column 5, lines 57–65). As a result of the unique catalysts and process identified herein, it is now possible to produce CTSA modified EPDM (of the type defined herein) which are substantially gel free and therefore not subject to the detrimental increases in polymer viscosity which may have heretofor been encountered.

(C) Catalyst. As noted previously, the literature discloses $ZnCl_2$ as a catalyst for the reaction of CTSA and EPDM. (R. J. Hopper, Rubber Chemistry and Technology, Vol. 49, page 346 Table I.) Furthermore, it has been reported that zinc chloride is used as a catalyst for various reactions, including haloalkylation reactions, alkylation of olefins with polyhalides and aralkylation of olefins with alpha-haloaralkanes. ("Friedel-Crafts Chemistry," G. A. Olah, John Wiley & Sons, 1973, p. 238; hereinafter referred to as "Olah"). This same reference goes on to state that zinc chloride is a "fairly selective and mild catalyst . . . in many reactions where halides or alcohols are required to react selectively with olefinic double bonds." In contrast, the inventors herein have observed that a catalytic agent such as zinc chloride promotes gelation or crosslinking in conjunction with the reaction of CTSA with EPDM, which was also suggested by Hopper in the above-cited article (id. page 350). Additionally in this reaction, the catalyst is required to be selective, catalyzing the addition reaction but not polymer crosslinking. Since both CTSA addition and polymer crosslinking are Lewis acid catalyzed, it is not obvious that any catalyst would be selective. Surprisingly, several such selective catalysts have been found which moderate the reaction of the polymer with CTSA in a preferred manner so as to provide a useful product. The problem of gelation or crosslinking is particularly significant when the process of modifying the EPDM with CTSA is conducted in the melt or under conditions where the EPDM is in substantially neat (non-solution) form. Therefor, the acidic halide zinc chloride is not useful as a catalyst for the process herein. The comparative examples demonstrate that, for the purposes of the present invention, zinc chloride does not result in the modified EPDM of interest. Other zinc compounds, such as zinc salts of weak acids when used alone (i.e., as sole catalyst) which result in gel sensitive systems can be used only under narrow specified conditions without resulting in undesired crosslinking. In accordance with the present invention, zinc salts of weak acids can be used under a wide range of conditions when the zinc salts are used in combination with a co-catalyst such as a metal salt of a weak acid of specified metals other than zinc. In a similar manner, iron salts of weak acids become selective catalysts when used in combination with a co-catalyst such as a metal salt of a weak acid of specified metals other than iron. The catalyst composition of the present invention can be used advantageously in reactions conducted either in the melt phase or in solution.

For purposes of the invention herein, crosslinking or gelatin in the modified polymer has been characterized by measurement of the Mooney viscosity before and after modification (the Mooney viscosity test is described in ASTM D-1646). A substantial increase in Mooney viscosity can render the product unprocessable. This is important in applications such as tires in which the product must be blended with highly unsaturated rubbery polymers, as well as fillers, extrudates, and curatives and extruded and molded. In other applications, the product Mooney viscosity may be less critical. However, in general, substantially gel-free products are more useful and hence more desirable. It has also been observed that an EPDM polymer which has been subjected to reaction with CTSA and in which undesirable crosslinking has occurred, typically undergoes a change in color, turning brown in contrast to its original white or light tan color. To be considered substantially gel free, it is intended that the modified polymer have a Mooney viscosity of less than about 130% of that of its original, unmodified polymer, preferably less than about 125%, more preferably less than about 120%, most preferably about 85% to about 115%, for example about 90% to about 110%. Such changes in Mooney viscosity (if they are to occur) can be conveniently observed in the laboratory using a grafting reaction conducted for about 3 minutes in the melt (e.g., in a Brabender ®) about 125° C., using catalyst concentrations of about 100 to about 500 parts per million (of metal) based on polymer. However, it should be appreciated by those skilled in the art that in those circumstances in which a polymer is subject to cross-linking, small changes in the extent of crosslinking can have a substantial affect on properties (e.g., Mooney viscosity). Therefore, it is preferred that determination of the acceptability of the catalyst be made under process conditions which emulate or duplicate actual production of the modified polymer, e.g., full scale reaction. The susceptibility of a polymer to crosslinking during reaction is exacerbated when such reaction is carried out in concentrated polymer solution or, in particular, when conducted in the melt. Therefore, under dilute solution reaction conditions (particularly at short reaction times), substantially gel free modification of EPDM with CTSA may be accomplished which may not be indicative of the response under melt phase reaction conditions.

THE CATALYST OF THE INVENTION

The process of the invention utilizes a catalyst comprising a zinc or iron salt of a weak acid (first salt) and a second salt which is a metal salt of a weak acid wherein the metal is selected from the group consisting of nickel, chromium, a Group IIA metal of the Periodic Table of Elements, such as beryllium, magnesium, calcium, strontium, barium and mixtures of any of these metals. The preferred Group IIA metals are selected from the group consisting of calcium and magnesium. Generally, the metal constituent of the second metal salt is selected to be a metal which does not in itself catalyze the halothiosulfonamide addition reaction.

The zinc salt or iron salt referred to herein as first salt) may bre represented by the formula: $MAn$, wherein M is a metal selected from the group consisting of zinc or iron and mixtures thereof; A is an anion or mixture of anions of a weak acid and n is a number corresponding to the oxidation state of M divided by the valence of said weak acid anion.

Considerations in the choice of anions include the following: anions which are sterically hindered, such as naphthenates or 2-ethylhexanoates are preferred as are anions with substantial hydrocarbon chains, such as stearates. Without wishing to be bound by theory, the sterically hindered anions may be advantageous in that they are capable of hindering the close approach of two polymer molecules, which is necessary for crosslinking to occur. Furthermore, anions comprising substantial hydrocarbon chains are particularly preferred in bulk phase reactions because of their compatibility with or solubility in hydrocarbons, such as molten polymers.

Weak acids are commonly characterized by means of the reference "pKa." This term is a measure of the completeness of the dissociation of the acid, Ka being the equilibrium constant of the dissociation of the acid, and the value pKa being the negative of the logarithm (to the base 10); the weaker the acid, the larger its pKa value. It is commonly accepted that acetic acid is a weak acid, with a pKa value at (25° C.) of about 4.75. For the purposes of this invention weak acids are those whose pKa are greater than about 4.0. Weak acids useful in the present invention include $C_4$ to $C_{20}$ saturated mono- or poly-carboxylic acids; in particular, a carboxylic acid selected from the group consisting of caproic, caprylic, lauric, stearic, 2-ethyl hexanoic, neodecanoic and naphthenic. Furthermore, the higher molecular weight carboxylic acid compounds are soluble in the rubber phase and are therefore more readily available for reaction, particularly when the reaction is carried out in the melt. Metal salts of this type are not mentioned at all in the comprehensive text by Olah cited above.

The second metal salt comprised in the catalyst composition of the present invention is a salt which does not in itself catalyze the halothiosulfonamide addition reaction but which, surprisingly, when used in combination with the zinc or iron salts of the present invention minimizes undesired crosslinking (i.e., gelation) of the reaction product. The second metal salt can be represented by the formula: $TAn$, wherein T is a metal selected from the group consisting of nickel, chromium, a Group IIA metal and mixtures thereof. Preferably, T is selected from the group consisting of nickel, chromium, calcium, magnesium, barium, and mixtures thereof. A is an anion or a mixture of anions of a weak acid. The anion of the second metal salt may be the same anion as the anion of the first salt or it may be an anion of a different weak acid. The weak acids from which the anion of the second metal salt are derived are the same as those which were described as being suitable for the first metal salt, namely, weak acids having a pKa value greater than 4.0, such as, including $C_4$ to $C_{20}$ saturated mono- or polycarboxylic acids, for example, carboxylic acids selected from the group consisting of caprovic, caprylic, lauric, stearic, 2-ethyl hexanoic, neodecanoic and napthenic acids. In the formula TAn, n is a number corresponding to the oxidation state of T divided by the valence of the anion. A sufficient amount of the second metal salt is present in the catalyst composition to provide an effective amount, that is, an amount which will produce less crosslinking than would occur if the zinc salt or iron salt would be used without the second salt. Preferably a sufficient amount of said first metal salt and said second metal salt are present in the catalyst composition of the present invention to provide a molar ratio of said second metal T to said first metal M (i.e., T:M) ranging from at least about 0.2:1 to about 20:1; more preferably, from about 0.5:1 to about 10:1, most preferably from about 0.5:1 to about 3:1.

More specifically, when the first metal is zinc, the molar ratio of said second metal to zinc is preferably 0.2:1 to 2:1. When the first metal is iron, the preferred molar ratio of said second metal to iron is preferably 1:1 to 3:1.

In carrying out the process of this invention, the total catalyst is present in the reaction medium at a concentration of about 1,000 to about 1 parts per million (ppm) metal in the polymer; preferably about 100 to about 5; more preferably about 50 to about 5 ppm. The catalyst can be premixed with EPDM (particularly for a melt phase process) or CTSA (or both), or added as an independent stream to the reactor; a combination of additive methods can also be used.

Reaction of the CTSA with EPDM can be achieved using both solution and melt phase (or neat) processes. One method involves addition of the chlorothiosulfonamide to a solution of the polymer in an inert organic solvent such as heptane, hexane, cyclohexane, methyl cyclohexane, chloroform, benzene or toluene. As taught in U.S. Pat. No. 3,970,133 more polar solvents are preferred. The reference teaches that they increase the rate of formation of polymer bound adduct; for example, adduct formation occurs much more rapidly in chloroform as a solvent than in hexane. The reference states that a mixture of nonpolar solvent with a highly polar solvent may be used advantageously; for example, a mixture of 40 volumes of hexane and 1 volume of acetic acid can produce substantially faster adduct formation as compared to hexane alone. However, the rate of substantially gel free adduct formation can be markedly improved by catalyst of the present invention.

Another method comprises directly blending the CTSA with the polymer by mixing means such as an internal mixer (Banbury ®, Brabender ® or extruder type) or an open roll mill. For direct mixing, it is advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (rubber, CTSA) and diluents, if any, which have been thoroughly and uniformly dried to avoid erratic reactivity and/or the formation of undesirable by-products due to hydrolysis of CTSA and the formation of $SO_2$, HCl and elemental sulfur. In the most preferred procedure all traces of moisture are removed. As a practical matter in view of large scale production and handling, it is preferred that polymer moisture be less than about 0.1 weight percent, more preferably less than about 0.05 weight percent, most preferably less than about 0.02 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 125° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

Melt phase reactions are preferably carried out in equipment and in processes as taught in U.S. Pat. Nos. 4,513,116; 4,548,995; 4,554,326 and 4,563,506 incorporated herein by reference and adapted to the specific requirements of the reaction and reactants herein. These references describe reaction of polymers in a continuous flow device such as an extruder, for example, a twin screw extruder. In the present process, a neat polymer, or one with a limited amount of diluent, is caused to react with the reagent, CTSA, to produce a useful product. For the purposes of this invention the terms melt phase and bulk phase are used interchangeably. Furthermore, it is to be understood that reference to the reaction of a neat polymer in the melt (or in a melt phase process) includes polymer with a limited amount of diluent. The use of a diluent is discussed below in conjunction with the feed zone of an extruder process for carrying out the invention. The polymer is a highly viscous material with a limited amount of unsaturation (reactive sites) and the CTSA is, under typical reaction conditions, a low viscosity fluid. Prior to the discovery of selective catalysts, the melt phase graft reaction had not been achieved under commercially useful conditions (i.e., rate, conversion and product quality). It is the discovery of selective catalysts that has permitted this advance.

The EPDM polymer and CTSA are preferably contacted, or reacted, in the presence of the catalyst of the invention in a continuous flow device. Suitable devices include kneaders, extruders (employing single or multiple screws, e.g., twin screws), continuous mixers and a blending/extrusion device referred to as a cavity transfer mixer (see, e.g., European Rubber Journal, July–August, 1982, pages 29–32 and G. M. Gale, U.K. Patent Application 8030586, 1980). Although the defined polymers can attain very high viscosities, even at relatively high temperatures, such devices are capable of sufficiently deforming such polymers to achieve the necessary degree of mixing and reaction.

The continuous flow device should be capable of initially forming the polymer feed into a cohesive mass and then deforming the polymer, disrupting the polymer surface, thereby exposing fresh, i.e., unreacted, polymer to the CTSA. The exposure of new surface does not necessarily require the use of high speeds where, e.g., an extruder is used. However, surface disrupting means are preferably employed, for example, pins, reverse flow sections, a "Maillefer" screw design, the cavities of a cavity transfer mixer, multiple flight screw section, interrupted flight sections, e.g., slotted flights, and combinations thereof. In this manner, efficient mixing and contact between the EPDM and CTSA are achieved at the lowest temperature consistent with achieving the desired extent of reaction. As a consequence, undesirable polymer degradation is avoided as are side reactions which may result in, e.g., crosslinking of the polymer.

CTSA is fed to the reaction zone, preferably by means of a separately controllable feed line. It is metered into the reaction zone so as to be present at the desired concentration, taking into consideration the polymer feed rate. Typically, feed rates (based on 100 kg per hour of polymer) of about 1 to 3 weight % are useful, preferably about 1.5 to about 2 weight %. Temperature is controlled in the range of about 25° C. to about 130° C. so that the CTSA is preferably in a liquid state to facilitate feed control and mixing. Particularly useful CTSA has a melting point of about 20°–30° C. at ambient pressure, so that it can be readily handled as a liquid at moderately elevated temperature.

The catalyst can be fed to the reaction zone by various convenient means: it can be predispersed at the desired concentration in the polymer or the CTSA or both; it can also be introduced as a separate feed stream into the feed zone and/or the reaction zone. Preferably, the catalyst is introduced by blending it with the polymer prior to introducing the CTSA into the continuous flow device.

When the region in which the polymer and CTSA are brought into contact, e.g., the reaction zone of an extruder, is not completely filled with polymer, the CTSA and the polymer are present as either discontinuous or continuous phases; a discontinuous polymer phase is preferred. A preferred operating mode of the process utilizes a reaction zone which is only partially filled with polymer; this permits reaction by-products to disengage from the polymer phase and facilitates contact between CTSA and newly generated polymer surface. Generally, the polymer is present so that it fills the available volume of the reaction zone to the extent of about 5 to about 95%, preferably 10 to about 75%, more preferably about 15 to about 50%, for example 20 to about 35% of the reaction zone.

One means of achieving a partially filled reaction zone is to feed, in a controlled manner, less polymer into the reaction zone than the conveying capacity of the zone. The space around the polymer is occupied in part by the CTSA and, as fresh surface is exposed to the CTSA reaction occurs.

Downstream of the reaction zone, vent means are provided to remove unwanted and undesirable reaction by-products, including HCl and $SO_2$, in the event any are formed by hydrolysis of CTSA due to, for example, the presence of moisture in the system. In a preferred embodiment, disengagement is achieved by injection of an inert gas, e.g., nitrogen, argon, carbon dioxide or dry air into said continuous flow device. The injection point or points for the inert gas may be downstream and/or upstream of the vent means. In another preferred embodiment, disengagement is made more efficient by imposing a vacuum on the vent means. The vent means may comprise one or more separate venting sections. In the case of multiple venting sections, it is preferable to provide appropriate screw elements between the vents to form a polymer seal between the individual venting sections.

Rapid and complete disengagement is effected by employing process features such as those described earlier with regard to reaction in order to achieve polymer deformation and surface disruption so as to expose fresh polymer surface to the inert gas. In a preferred embodiment, disengagement occurs in a region of the continuous flow device which is not completely filled with polymer. In a still more preferred embodiment, vent means are provided so that the inert gas and by-products are removed from the polymer conveying means. The amount of inert gas employed can be readily determined and should be an amount effective for the disengagement without being unnecessarily wasteful; inert gas injection can be achieved using more than one injection port. Another option is a region for injecting a polymer stabilizer into the continuous flow device. In another embodiment, the inert gas injection and venting configuration is designed so as to permit explosive release of the injected inert gas from the reacted polymer in order to facilitate in the removal of unwanted materials. Filter means can also be employed to remove undispersed material from the modified polymer.

Preferably the various zones which have been described are separated from one another in such a manner as to permit maximum independent control of conditions in each zone. For example, a seal comprising polymer melt is formed between the feed section and reaction zone so as to avoid "blow back" of CTSA. A polymer melt seal may also be provided to allow separation between multiple vent zones. The means of achieving such a polymer melt seal are well known to those skilled in the art of polymer processing.

DESCRIPTION OF THE PREFERRED EMBODIMENT

Details and conditions are described below for a preferred embodiment utilizing an extruder-reactor, but the principles disclosed are broadly applicable to the general process. It is to be understood that reference to the screw of an extruder is to include both single and multiple (e.g., twin) screw extruders, intermeshing and nonintermeshing as well as co- and counterrotating screws. The extruder-reactor may be thought of as carrying out the polymer modification in various operating zones:

(A) Feed Zone—in which polymer is introduced into the extruder-reactor in convenient form. This form includes, for example, particles from bales of rubber which have been comminuted, particles and/or pellets of rubber which may be in stable form as produced and crumb from the finishing line of a rubber manufacturing plant, each of which is preferably free of reactive contaminants, e.g., moisture and reactive hydrocarbons.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures and shearing forces are preferred. This can be achieved, e.g., by utilizing extruder screws with relatively deep flights and by keeping the length, as short as possible commensurate with desired production rates. For example, polymer can be introduced at about room temperature and exit from the feed zone at about 40° to 150° C.

A restrictive dam is used to separate the feed zone from the reaction zone which follows it so as to prevent back leakage of reactants. This dam is not restrictive enough, however, to cause excessive overheating of the polymer. A restrictive dam can be, for example, a reverse flighted screw section, a filled screw section (also referred to as a compounder), a shallow flighted screw section, an unflighted screw section, combinations thereof, or other means known in the art. An unflighted screw section is preferred, and it can have a larger diameter than the root diameter upstream of it, for example 5-25% larger, but not greater than the screw flight diameter. If a reverse flighted screw section is employed it can be single or multi-flighted, preferably multi-flighted.

In addition to the polymer which is introduced into the feed zone, an optional diluent may also be added. A diluent can function to reduce the viscosity of the polymer to a level commensurate with subsequent good mixing and reaction without the necessity for excessive heat generation and a risk of molecular weight breakdown and undesirable side reactions. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include inert gases such as nitrogen and argon, as well as gases such as carbon dioxide and air.

A diluent different in kind from those described above, but also suitable may also be retained with or in the polymer, such as a hydrocarbon oil. Suitable oils include saturated aliphatic oil and rubber process oils that are essentially saturated; the oil should not react with the CTSA. Where such oils are utilized, the modified polymer would contain oil after recovery and drying and would commonly be referred to as "oil extended." Oil extended rubber is well known in the art and various grades of oil extended EPDM, styrene butadiene rubber, and polybutadiene made by other means are commercially available. Such products are particularly useful where it is desirable, for example, to extend the rubber with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 wt. % based on the polymer, preferably less than about 15 wt. %, most preferably about 5 to about 10 wt. %.

As discussed hereinabove, catalyst can be blended with the polymer prior to the polymer being fed to the extruder and/or it can be added as a separate feed stream. If as a separate stream, it is preferred that the catalyst be dispersed or dissolved in a carrier diluent to facilitate flow control. Suitable diluents include mineral oil and hydrocarbon, diluents inert to the reaction, for example, halogenated hydrocarbons.

(B) Reaction Zone—can generally be described as the zone in which the CTSA is caused to react with the polymer to completely effect the grafting reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and, along with residence time in the reaction zone, the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity.

Control is required in order to optimize residence time and avoid polymer degradation and gelation. This can be achieved by, for example, controlling the CTSA feed rate in comparison to the rubber feed rate, design of the reaction zone (length, screw features and configuration, injection means, temperature, etc.) and RPM so as to determine time of reaction and to control the relative rates of the desired reaction versus competing side reactions and gelation.

The CTSA can be gaseous, liquid or solid and may be added either in a pure state or diluted with a suitable inert fluid. In this improved process alternative reaction zone mixing techniques are feasible. Injecting CTSA at a point or points filled with polymer can be employed. Similarly the reaction is allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space not occupied by the polymer. A moderately positive injection pressure is suitable; the pressure selected should maintain a positive flow into the reaction zone and prevent plugging of the line. The specific pressure chosen is a matter of operating convenience. Generally, pressure at the point of injection is about 15 to about 400 psig.

Also important for achieving efficient reaction of the polymer and CTSA is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means, useful in combination with equipment design features, include operation of the screw at a rotation rate (using, for example, a 2 inch diameter screw) of about 50 to about 600 RPM, preferably about 70 to about 400 RPM, most preferably about 90 to about 350 RPM.

Catalyst addition can also be accomplished in the reaction zone, although with more difficulty insofar as achieving satisfactory dispersion. In such circumstances, addition at a point near the feed zone is preferred in order to allow maximum opportunity for mixing.

Overall, it is desirable, by control of polymer viscosity, chamber and screw design, screw RPM, and operating pressure, to prevent excessive temperatures in the reaction zone while maintaining a high level of mixing. It is desirable that a reaction temperature of less than about 170° C. be achieved, preferably about 40° C. to about 170° C., more preferably about 50° C. to about 150° C., most preferably about 60° C. to about 130° C.

(C) Sweep Zone—in which residual by-product $SO_2$ and HCl are swept out of the extruder to avoid corrosion of the equipment. Suitable means to effect removal of these materials is the injection of an inert gas into the extruder. This is effected by employing process features such as those just described with regard to the reaction zone in order to disrupt the polymer surface and continually expose new surface to the inert gas in the sweep zone. In a preferred embodiment vent means are provided in this zone to permit the inert gas and disengaged materials to be swept out and immediately removed from the system. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the sweep zone. As discussed earlier, multiple injection sites can be used as well as a supplementary injection zone. In another embodiment, pressure in the system is controlled in order to explosively remove the unwanted products by maintaining pressure in the system up to the region of the vent where it is allowed to be rapidly reduced to ambient.

The sweep zone is designed so that the inert gas contacts the reaction products from the reaction zone as soon as possible after the grafting reaction. This is achieved when, e.g., a dam is used between the reaction and sweep zones, by having it as short as possible consistent with its functioning as a restrictive dam. The nature and configuration of various alternatives for the restrictive dam are described above for the dam between the feed and reaction zones. The injection port for the inert gas can be located as close as possible to the downstream end of the dam or the sweep gas can be injected so as to flow countercurrent to the flow of the grafted product mixture. Additionally, the sweep gas can first be injected into the reaction zone, downstream of CTSA introduction to effect the initial removal of by-products using the methods just described.

Polymer stabilizing agents can optionally be added in this zone. This can be done by incorporating the stabilizers at an injection point. Suitable stabilizers include those known in the art for stabilizing halogenated polymers.

(D) Exit Zone—preferably the extruder-reactor comprises a final exit zone (D) in which the temperature of the modified polymer product is adjusted for delivery therefrom at a temperature below about 170° C., more preferably below about 150° C. and most preferably below about 130° C., as a contribution to the stability of the polymer. Also in the exit zone, stabilizer(s) may initially be added to the swept polymer product if not added in the sweep zone, or additional stabilizer(s) can be added.

In addition to the extruder-reactor features just described, the process of this invention can also incorporate a system for recycling any organic diluent that may be added to the feed zone and/or included with the CTSA and, optionally, means for back-mixing the modified polymer to assure that the final packaged polymer is a homogeneous product.

Materials of construction in the feed zone, reaction zone and sweep zone are selected from those well known in the art to prevent or minimize reaction of the equipment with CTSA, $SO_2$ and HCl, in view of safety considerations as well as long equipment life.

The modified polymers of this invention can be processed in standard equipment used for each such polymers, such as internal mixers (e.g., Banbury®), mills, extruders, calenders, etc. Said polymers are amenable to conventional compounding practice and various fillers and extenders can be incorporated, e.g., various carbon blacks, clays, silicas, carbonates, oils, resins, waxes, etc. The modified rubber of this invention may be cured or vulcanized by any of the prior art methods suitable for EPDM rubbers, e.g., using sulfur, sulfur-containing curing agents (such as sulfenamide derivatives, benzothiazyl disulfide, tetramethylthiuram disulfide, alkyl phenol disulfide, etc.), and mixtures thereof. Further details can be found in the R. J. Hopper references described hereinabove. Curing is usually accomplished at a temperature of from about 140° C. to about 250° C., preferably 150° C. to about 200° C., and usually takes from 1 to 150 minutes. The modified rubber is particularly useful in blends with high unsaturation rubbers, e.g., styrene-butadiene rubber, polyisoprene, polybutadiene, etc., as well as lower functionality rubbers such as bromobutyl and chlorobutyl, and is particularly useful in tire applications, e.g., tire sidewalls (see e.g., U.S. Pat. No. 3,970,133).

The practice of this invention is further illustrated by reference to the following examples which are intended to be representative rather than restrictive of the scope of the invention. Unless otherwise indicated, all parts and percentages are by weight.

In the following examples, the CTSA is N-chlorothio-N-methylbenzenesulfonamide.

Prior to use, the polymer was tested to determine moisture content and, where necessary, dried by conventional means, such as mixing in a heated Banbury mixer, so that moisture contents were 200 ppm or less.

The examples 1 to 6 were performed using the following reagents:

Polymer A was a commercially available grade of EPDM designated as Nordel® 2744, (manufactured by DuPont). Polymer A also contains a low concentration of norbornadiene which results in no additional residual unsaturation in the polymer. In summary:

Polymer A—an EPDM, with 70% ethylene and 3.5% hexadiene, Mooney Viscosity (1+4, 100° C.)=70.

Zinc naphthenate—a mineral spirits solution, zinc content 10%.

Calcium naphthenate—a mineral spirits solution, calcium content 4%.

CTSA—N-chlorothio-N-methylbenzenesulfonamide (89% purity).

EXAMPLES 1 to 6

These examples were carried out by the addition of zinc naphthenate and/or calcium naphthenate, followed by CTSA to a stirred, refluxing, nitrogen blanketed solution of Polymer A in heptane; the quantities used being shown in Table I (naphthenate is abbreviated as NP in the Tables). Small samples were removed and the product precipitated with acetone in order to monitor addition of CTSA to the polymer. After five (5) hours, the solution was cooled and the entire volume was treated with acetone to precipitate the product and provide a sample large enough for Mooney viscosity measurement.

With only zinc naphthenate present at 205 ppm zinc (Example 1), an unacceptably high Mooney viscosity results. The high Mooney viscosity seems to be associated with loss of CTSA from the modified polymer, which is evident from the tabulated data. The product color was brown, which is also indicative of crosslinking.

With zinc naphthenate at the same concentration as in Example 1, but with calcium present at 0.70 times the zinc concentration (Example 2), an acceptable product Mooney viscosity results. However, there appears to be some loss of CTSA from the modified product and the product, though largely white, contained some brown particles. This seems to indicate some isolated localized crosslinking, which does not greatly affect overall product Mooney viscosity.

At calcium to zinc molar ratios of 1.0 to 2.0 (Examples 3 and 4), acceptable product Mooney viscosities result and the product color was uniformly white.

At higher calcium to zinc ratios (Example 5) or with no zinc at all (Example 6), little reaction occurs. In the case of Example 6, the product CTSA levels are comparable to those found in an uncatalysed reaction; i.e., calcium naphthenate itself does not catalyse the addition reaction.

It should be noted that Examples 1 and 6 are not examples of the invention.

TABLE I

| | EXAMPLE | | | | | |
|---|---|---|---|---|---|---|
| | 1 | 2 | 3 | 4 | 5 | 6 |
| Heptane (ml) | 1000 | 1000 | 1000 | 1000 | 1000 | 1000 |
| Polymer A (g) | 45 | 45 | 45 | 45 | 45 | 45 |
| CTSA (g) | 1.5 | 1.5 | 1.5 | 1.5 | 1.5 | 1.5 |
| Zn(NP)2 (g) | 1.5 | 1.5 | 1.5 | 1.5 | 1.5 | 0.0 |
| Ca(NP)2 (g) | 0.0 | 1.5 | 3.0 | 4.5 | 9.0 | 1.5 |
| Zn, ppm | 205 | 204 | 204 | 204 | 202 | 0 |
| Ca, ppm | 0 | 82 | 163 | 244 | 486 | 82 |
| Ca:Zn MOLE RATIO | 0.0 | 0.7 | 1.3 | 2.0 | 3.9 | |
| REACTION TIME(h) | PRODUCT CTSA (mole/g) | | | | | |
| 1 | 0.116 | 0.132 | 0.119 | 0.110 | 0.040 | 0.005 |
| 2 | 0.089 | 0.136 | 0.121 | 0.114 | | |
| 3 | 0.088 | 0.133 | 0.121 | 0.111 | | |
| 4 | 0.085 | 0.116 | 0.122 | 0.111 | | |
| 5 | 0.078 | 0.117 | 0.120 | 0.112 | 0.038 | 0.011 |
| MOONEY VISCOSITY (after 5h) | 147 | 81 | 72 | 79 | | |

EXAMPLES 7 TO 14

These Examples were carried out in a 50 ml. internal mixer (Brabender) and served as a screening method for evaluation of appropriate catalyst to co-catalyst ratios for use in larger scale continuous extruder experiments. The polymer, Polymer A, was brought to 100° C. in the mixer. The CTSA was added and washed in with a small volume of heptane, followed by a mixture of the catalyst, zinc naphthenate, and the co-catalyst, calcium naphthenate, again with heptane washing. The quantities used are shown in Table II. Mixing was continued for four (4) minutes during which time the temperature was maintained at 125° C. or below.

At calcium to zinc molar ratios less than or equal to 1.0 (Examples 7 to 9), an unacceptable increase in Mooney viscosity occurs. At calcium to zinc molar ratios between 1.3 and 2.3 (Examples 10 to 12), the product Mooney viscosity is essentially the same as that of the feed polymer and this is a desirable result. At higher ratios (Example 24), reduced reaction occurs as shown by the lower CTSA level in the product. The reduced Mooney viscosity of the product from Example 24 may be due to lubrication of the polymer in the Mooney viscometer by unreacted CTSA.

Example 20 is not an example of the invention.

TABLE II

| | EXAMPLE | | | | | | | |
|---|---|---|---|---|---|---|---|---|
| | 7 | 8 | 9 | 10 | 11 | 12 | 13 | 14 |
| Polymer A (g) | 45 | 45 | 45 | 45 | 45 | 45 | 45 | 45 |
| CTSA (g) | 1.5 | 1.5 | 1.5 | 1.5 | 1.5 | 1.5 | 1.5 | 1.5 |
| Zn(NP)2 (g) | 0.20 | 0.20 | 0.20 | 0.20 | 0.20 | 0.20 | 0.20 | 0.20 |
| Ca(NP)2 (g) | 0.00 | 0.20 | 0.30 | 0.40 | 0.60 | 0.70 | 0.80 | 0.90 |
| Zn, ppm | 428 | 426 | 426 | 425 | 423 | 422 | 421 | 420 |
| Ca, ppm | 0 | 171 | 255 | 340 | 507 | 591 | 674 | 756 |
| Ca:Zn MOLE RATIO | 0.0 | 0.7 | 1.0 | 1.3 | 2.0 | 2.3 | 2.6 | 2.9 |
| PRODUCT DATA | | | | | | | | |
| MOONEY VISCOSITY | 152 | 154 | 93 | 69 | 70 | 68 | | |
| CTSA, mmole/g | 0.088 | 0.096 | 0.100 | 0.095 | 0.086 | 0.080 | 0.048 | 0.036 |
| COLOR | Brown | Brown | Brown | Cream | Cream | Cream | | |

At calcium to zinc molar ratios less than or equal to 1.0 (Examples 7 to 9), an unacceptable increase in Mooney viscosity occurs. At calcium to zinc molar ratios between 1.3 and 2.3 (Examples 10 to 12), the product Mooney viscosity is essentially the same as that of the feed polymer and this is a desirable result. At higher ratios (Examples 13 to 14), significantly reduced reaction occurs as shown by the low CTSA levels in the product.

Examples 7 to 9 are not examples of the invention.

EXAMPLES 15 TO 19

These Examples were carried out in the manner of Examples 7 to 14, except that magnesium neodecanoate (4% magnesium) replaced calcium naphthenate. The quantities used are shown in Table III, which also includes the results from these Examples and for the purposes of comparison, the results from Example 7. Neodecanoate is abbreviated as ND in the tables.

At magnesium to zinc molar ratios less than or equal to 1.0 (Examples 7 and 15), a large increase in Mooney viscosity occurs. A value of about 90 in Example 15 is on the borderline of acceptability and lower values are preferred, e.g., as in Examples 16 to 19. At magnesium to zinc molar ratios between 1.5 and 4.0 (Examples 16 to 19), the product Mooney viscosity similar to that of the feed polymer.

EXAMPLES 20 TO 24

These Examples were carried out in the manner of Examples 7 to 14, except that ferric 2-ethylhexanoate (6% iron) replaced zinc naphthenate and that the catalyst, ferric 2-ethylhexanoate, and co-catalyst, calcium naphthenate were added separately, rather than as a mixture. The quantities used are shown in Table IV, which also shows the results from these Examples.

At calcium to iron molar ratios less than or equal to 1.0 (Examples 20 to 21), an increase in Mooney viscosity occurs. At calcium to iron molar ratios between 2.0 and 3.0 (Examples 22 to 23), the product Mooney viscosity is essentially the same as that of the feed polymer and this is a desirable result.

TABLE III

| | EXAMPLE | | | | | |
|---|---|---|---|---|---|---|
| | 7 | 15 | 16 | 17 | 18 | 19 |
| Polymer A (g) | 45 | 45 | 45 | 45 | 45 | 45 |
| CTSA (g) | 1.5 | 1.5 | 1.5 | 1.5 | 1.5 | 1.5 |
| Zn(NP)2 (g) | 0.20 | 0.20 | 0.20 | 0.20 | 0.20 | 0.20 |
| Mg(ND)2 (g) | 0.00 | 0.18 | 0.27 | 0.37 | 0.55 | 0.74 |
| Zn, ppm | 428 | 427 | 426 | 425 | 423 | 422 |
| | 0 | 154 | 230 | 314 | 466 | 624 |
| Mg:Zn MOLE RATIO | 0.0 | 1.0 | 1.5 | 2.0 | 3.0 | 4.0 |
| PRODUCT DATA | | | | | | |
| MOONEY, 1 + 4, 100° C. | 152 | 90.2 | 68.4 | 63.5 | 78.2 | 76.7 |
| CTSA, mmole/g | 0.008 | 0.103 | 0.093 | 0.099 | 0.095 | 0.093 |

TABLE IV

| | REACTION # | | | | |
|---|---|---|---|---|---|
| | 20 | 21 | 22 | 23 | 24 |
| Polymer A (g) | 45 | 45 | 45 | 45 | 45 |
| CTSA (g) | 1.5 | 1.5 | 1.5 | 1.5 | 1.5 |
| Fe(EH)3 (g) | 0.20 | 0.20 | 0.20 | 0.20 | 0.20 |
| Ca(NP)2 (g) | 0.00 | 0.22 | 0.44 | 0.65 | 0.87 |
| Fe, ppm | 257 | 256 | 255 | 253 | 252 |
| Ca, ppm | 0 | 188 | 373 | 549 | 732 |
| Ca:Fe MOLE RATIO | 0.0 | 1.0 | 2.0 | 3.0 | 4.0 |
| PRODUCT DATA | | | | | |
| MOONEY, 1 + 4, 100° C. | 163 | 82 | 68 | 70 | 58 |
| CTSA, mmole/g | NA | 0.096 | 0.093 | 0.084 | 0.075 |

Footnotes:
NA = not available, unable to obtain suitable thin film for measurement.
EH = denotes ethylhexanoate.

EXAMPLES 25 TO 29

These Examples were carried out in the manner of Example 7, except that the catalyst and co-catalyst were added as a heptane solution (2.25 g zinc naphthenate; 1.00 g calcium naphthenate; 6.75 g heptane) in order to maintain a constant catalyst to co-catalyst ratio at various catalyst concentrations. The quantities used are shown in Table V. In order to keep conditions as identical as possible, heptane was added as indicated in Table V; it is recognized that this solvent does not have a significant effect on the course of the reaction.

As the results in Table V show, a calcium to zinc molar ratio of 1.5 is sufficient to moderate the crosslinking tendency of the zinc catalyst over a wide range of catalyst concentrations.

EXAMPLES 30 TO 35

These Examples were carried out in the manner of Example 7, except that the catalyst and co-catalyst were added as heptane solutions to conveniently allow use of low catalyst concentrations. The quantities used and the results are shown in Table VI.

At the concentration used, the crosslinking tendency of the zinc catalyst is much less than at the higher concentrations of Examples 7 to 14. However, it is clear that the calcium co-catalyst still moderates this behavior. Additionally, the results show that much higher calcium to zinc molar ratios can be used before the inhibiting effect of the co-catalyst, shown in Example 13 and 14 becomes significant. Apparently, this inhibiting effect is related to the absolute concentration of the calcium co-catalyst, rather than to its molar ratio to the zinc catalyst.

Comparison of these results with those of Examples 7 to 14, indicates that it is desirable to use as low a concentration of the zinc catalyst as possible, consistent with obtaining the extent of reaction desired in the available residence time.

EXAMPLES 36 TO 38

These Examples were carried out in the manner of Example 7, except that the co-catalyst was nickel 2-ethylhexanoate, which has a nickel content of 12 percent. The results in Table VII show that at nickel to zinc, molar ratio of 2.0 or less some degree of crosslinking occurs. A molar ratio of 3.0 is preferred.

EXAMPLES 39 TO 41

These Examples were carried out in the manner of Example 7, except that the co-catalyst was chromium 2-ethylhexanoate. The results in Table VIII show that at chromium to zinc, molar ratio of 2.0 or less some crosslinking occurs. A molar ratio of 3.0 is preferred.

Examples 39 and 40 are not examples of the invention.

TABLE V

| | EXAMPLE # | | | | |
|---|---|---|---|---|---|
| | 25 | 26 | 27 | 28 | 29 |
| Polymer A (g) | 45 | 45 | 45 | 45 | 45 |
| CTSA (g) | 1.5 | 1.5 | 1.5 | 1.5 | 1.5 |
| Ca:Zn SOLUTION (g) | 2.00 | 0.50 | 0.20 | 0.10 | 0.05 |
| HEPTANE (g) | 0.00 | 1.50 | 1.80 | 1.90 | 1.95 |
| Zn, ppm | 430 | 108 | 43 | 22 | 11 |
| Ca, ppm | 387 | 97 | 39 | 19 | 10 |
| Ca:Zn MOLE RATIO | 1.5 | 1.5 | 1.5 | 1.5 | 1.5 |
| PRODUCT DATA | | | | | |
| MOONEY, 1 + 4, 100° C. | 65 | 69 | 71 | 73 | 72 |
| CTSA, mmole/g | 0.093 | 0.092 | 0.087 | 0.091 | 0.091 |

Ca:Zn SOLUTION = 2.25 g Ca(NP)2, 1.00 g Zn(NP)2, 6.75 g heptane

TABLE VI

| | EXAMPLE # | | | | | |
|---|---|---|---|---|---|---|
| | 30 | 31 | 32 | 33 | 34 | 35 |
| Polymer A (g) | 45 | 45 | 45 | 45 | 45 | 45 |
| CTSA (g) | 1.5 | 1.5 | 1.5 | 1.5 | 1.5 | 1.5 |
| Zn SOLUTION (g) | 1.00 | 1.00 | 1.00 | 1.00 | 1.00 | 1.00 |
| Ca SOLUTION (g) | 0.00 | 0.07 | 0.205 | 0.34 | 0.48 | 0.61 |
| HEPTANE (g) | 1.00 | 0.93 | 0.795 | 0.66 | 0.52 | 0.39 |
| Zn, ppm | 22 | 22 | 22 | 22 | 22 | 22 |
| CA, ppm | 0 | 14 | 40 | 66 | 93 | 118 |
| Ca:Zn MOLE RATIO | 0.0 | 1.0 | 3.0 | 5.0 | 7.0 | 9.0 |
| PRODUCT DATA | | | | | | |
| MOONEY, 1 + 4, 100° C. | 78 | 70 | 71 | 71 | 71 | 69 |
| CTSA, mmole/g | 0.087 | 0.095 | 0.086 | 0.089 | 0.080 | 0.086 |

Zn SOLUTION = 0.10 g Zn(NP)2, 9.90 g heptane
Ca SOLUTION = 2.25 g Ca(NP)2, 7.75 g heptane

TABLE VII

| | EXAMPLE # | | | |
|---|---|---|---|---|
| | 7 | 36 | 37 | 38 |
| Polymer A (g) | 45 | 45 | 45 | 45 |
| CTSA (g) | 1.5 | 1.5 | 1.5 | 1.5 |
| Zn(NP)2 (g) | 0.20 | 0.20 | 0.20 | 0.20 |
| Ni(EH)2 (g) | 0.00 | 0.15 | 0.30 | 0.45 |
| Zn, ppm | 428 | 427 | 426 | 424 |
| Ni, ppm | 0 | 384 | 766 | 1145 |
| Ni:Zn MOLE RATIO | 0.0 | 1.0 | 2.0 | 3.0 |
| PRODUCT DATA | | | | |
| MOONEY, 1 + 4, 100° C. | 152 | 87 | 80 | 73 |
| CTSA, mmole/g | 0.088 | 0.087 | 0.082 | 0.097 |

TABLE VIII

| | EXAMPLE # | | | |
|---|---|---|---|---|
| | 20 | 39 | 40 | 41 |
| Polymer A (g) | 45 | 45 | 45 | 45 |
| CTSA (g) | 1.5 | 1.5 | 1.5 | 1.5 |
| Fe(EH)3 (g) | 0.20 | 0.20 | 0.20 | 0.20 |
| Cr(EH)3 (g) | 0.00 | 0.23 | 0.45 | 0.68 |
| Fe, ppm | 257 | 256 | 255 | 253 |
| Cr, ppm | 0 | 270 | 525 | 789 |
| Cr:Fe MOLE RATIO | 0.0 | 1.0 | 2.0 | 3.0 |
| PRODUCT DATA | | | | |
| MOONEY, 1 + 4, 100° C. | 163 | 153 | 137 | 62 |
| CTSA, mmole/g | NA | NA | 0.086 | 0.081 |

NA = not available, could not get thin film for infrared measurement.

What is claimed is:

1. A catalyst comprising:
   (a) A first salt of an acid being represented by the formula $MA_n$, wherein A is an anion or mixture of anions of an acid, said acid has a pka greater than about 4.0 at 25° C., and M is a metal selected from the group consisting of zinc, iron and mixtures thereof; and (b) an effective amount of a second salt of an acid, said second salt being represented by the formula $TA_n$, wherein T is a metal selected from the group consisting nickel, chromium, a Group IIA metal of the Periodic Table of Elements and mixtures thereof; said acid having a pka greater than about 4.0 at 25° C., and wherein A is an anion or mixture of anions which is the same or different from the anion of said first metal salt and wherein n in said first metal salt is a number corresponding to the respective oxidative state of M or T divided by the valence of said anion; and wherein the molar ratio of said second metal salt to said first metal salt ranges from about 0.2:1 to 20:1.

2. The catalyst of claim 1, wherein the metal of said second salt is selected from the group consisting of nickel, chromium, calcium, magnesium, barium and mixtures thereof.

3. The catalyst of claim 1, wherein said first metal is zinc and wherein said molar ratio of said second metal to said zinc ranges from about 0.2:1 to about 2:1.

4. The catalyst of claim 1, wherein said first metal is iron and wherein said molar ratio of said second metal to said iron ranges from about 1:1 to about 3:1.

5. The catalyst of claim 1, wherein said anion of a weak acid is derived from acids selected from the group consisting of $C_4$ to $C_{20}$ mono- and polycarboxylic acids and mixtures thereof.

6. The catalyst of claim 5, wherein said anion is derived from an acid selected from the group consisting of caproic, caprylic, lauric, stearic, 2-ethyl hexanoic, neodecanoic, naphthenic, and mixtures thereof.

* * * * *